No. 728,408. PATENTED MAY 19, 1903.
E. A. PECK.
BUNDLE CARRIER.
APPLICATION FILED AUG. 5, 1901.
NO MODEL.
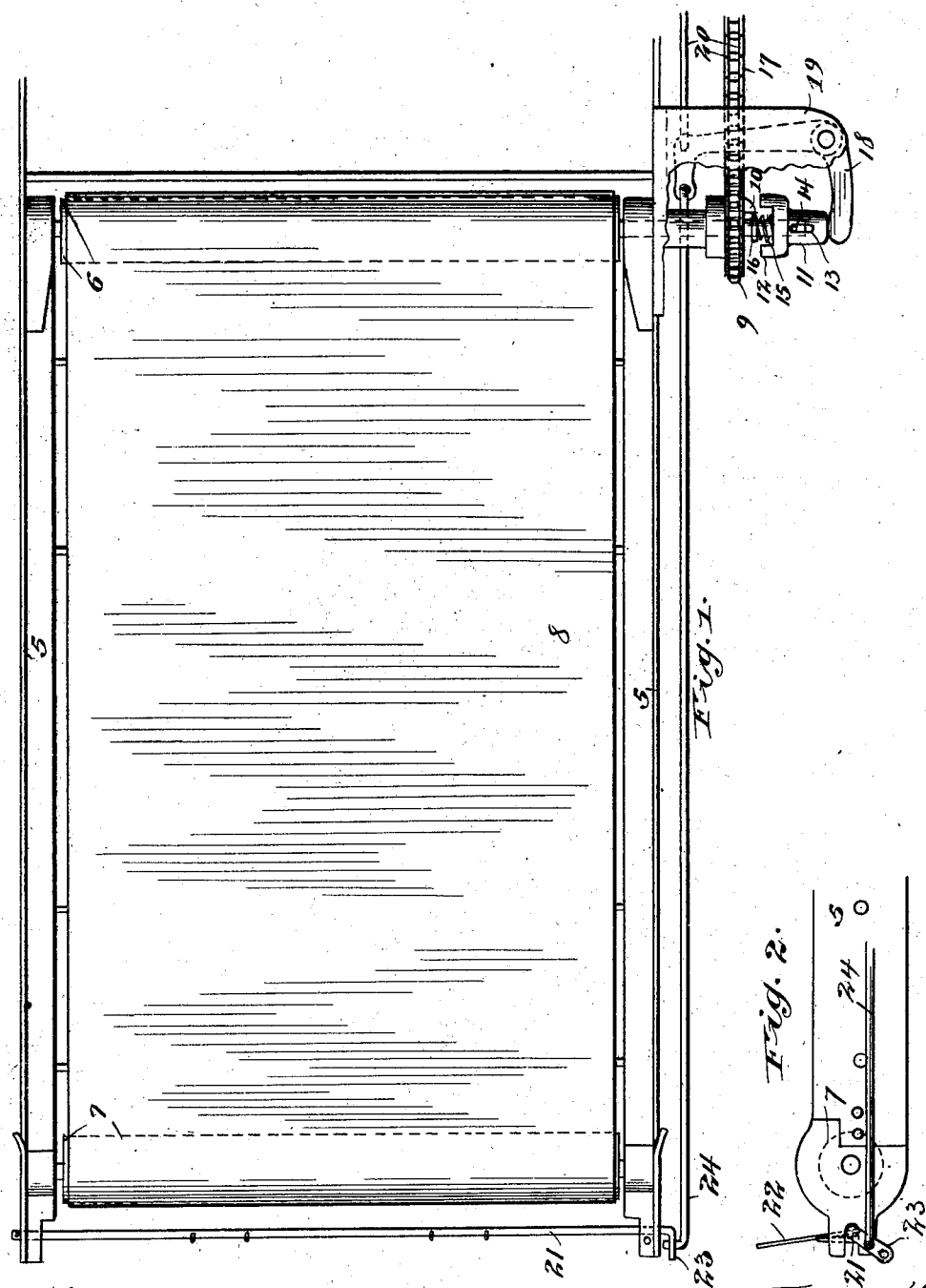
Witnesses:
Inventor,
Ezra A. Peck No. 728,408. Patented May 19, 1903.

UNITED STATES PATENT OFFICE.

EZRA A. PECK, OF PEKIN, ILLINOIS, ASSIGNOR TO THE ACME HARVESTER COMPANY, OF PEORIA, ILLINOIS, A CORPORATION OF ILLINOIS.

BUNDLE-CARRIER.

SPECIFICATION forming part of Letters Patent No. 728,408, dated May 19, 1903.

Application filed August 5, 1901. Serial No. 70,903. (No model.)

*To all whom it may concern:*

Be it known that I, EZRA A. PECK, of Pekin, Illinois, have invented certain new and useful Improvements in Bundle-Carriers, of which the following is a specification.

My invention relates to improvements in bundle-carriers of that class wherein an endless belt or conveyer intermittently driven is employed for the purpose of discharging the bundles periodically; and my invention relates to the means for driving such endless belt or conveyer and also to means for retaining the bundles on the carrier.

The invention is illustrated in the accompanying drawings, in which—

Figure 1 is a plan view, and Fig. 2 a side elevation, of the outer end of the carrier.

In the drawings, 5 represents a rectangular frame, in which are journaled the rollers 6 7. 8 represents an endless belt of canvas carried by said rollers and forming the carrier for the bundles. The shaft of the roll 6 is extended laterally on one side of the carrier-frame and has a loose gear 9 mounted thereon, provided with a clutch member 10. On the outer end of the shaft is applied another clutch member 11, which is in the form of a cup having the teeth 12. This cup-casting has a slot 13 therein and a pin 14 in the end of the shaft, projecting into the slot. A spring 15 is interposed between the clutch member 11 and the collar 16 on the roll-shaft. The parts of the clutch are thus kept out of engagement, and the sprocket-wheel 9 runs idly on its shaft, being driven by the chain 17.

18 represents a bell-crank lever pivoted to a bracket 19 and bearing at one end upon the sliding member 11 of the clutch.

An operating-rod 20 extends from the bundle-carrier and by suitable connections (not shown) is carried to the driver's station. Pull on the rod 20 engages the clutch, and the carrier-belt with its accumulated load of bundles will be operated, thus discharging the load at a single point.

In passing over rough ground it frequently happens that the bundles will fall off over the outer end of the belt, thus increasing the labor of collecting them. To obviate this, I apply a retaining device at the outer end of the carrier, comprising a rock-shaft or a rod 21, having upstanding fingers 22. The end of the rod 21 is cranked, as shown at 23, and a rod 24 connects the crank with one arm of the bell-crank 19. Thus whenever the clutch is shifted by the pull on the rod 20 the same operation rocks the rod 21, carrying the fingers 22 downwardly and permits the bundles to be delivered from the end of the carrier by the traveling belt. When the operating pressure is released, the spring 15 throws the bell-crank, disengaging the clutch and rocking the rod 21, thus bringing the retaining-fingers into position. Of course a separate spring might be employed for this purpose; but its power would have to be overcome by the operator in shifting the clutch, and a light spring is sufficient for both purposes.

I claim—

In a self-binding harvester, a carrier adapted to be supported from, and projected in line with, the harvester-platform, and comprising a suitable supporting-frame, rollers journaled parallel to each other transversely in said frame, an endless belt mounted upon said rollers, a driving-gear applied to the shaft of one of said rollers, a clutch mechanism associated with said driving-gear, and means extending from the bundle-carrier to the driver's station for operating said clutch, a rock-shaft mounted at the outer end of the bundle-carrier and having upstanding arms for detaining the bundles, and a connection between the clutch-shifting mechanism and the rock-shaft whereby, upon the shifting of the clutch the rock-shaft is moved to lower the bundle-retaining arms, substantially as described.

EZRA A. PECK.

Witnesses:
H. J. HUISKEN,
A. C. BLACK.